United States Patent
Parantainen et al.

(10) Patent No.: US 7,092,373 B2
(45) Date of Patent: Aug. 15, 2006

(54) ADVANCED METHOD AND ARRANGEMENT FOR TRANSFERRING INFORMATION IN A PACKET RADIO SERVICE

(75) Inventors: Janne Parantainen, Helsinki (FI); Raino Lintulampi, Kiviniemi (FI); Guillaume Sébire, Helsinki (FI)

(73) Assignee: Nokia Corporation, Espoo (FI)

( * ) Notice: Subject to any disclaimer, the term of this patent is extended or adjusted under 35 U.S.C. 154(b) by 924 days.

(21) Appl. No.: 10/071,324

(22) Filed: Feb. 8, 2002

(65) Prior Publication Data
US 2002/0181422 A1 Dec. 5, 2002

(30) Foreign Application Priority Data
Feb. 9, 2001 (FI) .................................. 20010251

(51) Int. Cl.
*H04B 7/212* (2006.01)
(52) U.S. Cl. ....................................... 370/337; 370/338
(58) Field of Classification Search ................ 370/329, 370/338, 349, 322, 348
See application file for complete search history.

(56) References Cited

U.S. PATENT DOCUMENTS

| 6,438,114 B1 * | 8/2002 | Womack et al. ............ 370/329 |
| 6,529,525 B1 * | 3/2003 | Pecen et al. ................ 370/469 |

(Continued)

FOREIGN PATENT DOCUMENTS

WO   WO 99/16264   4/1999

(Continued)

OTHER PUBLICATIONS

"Digital Cellular Telecommunications System (Phase 2+); General Packet Radio Service (GPRS); Mobile Station (MS)—Base Station System (BSS) Interface; Radio Link Control/Medium Access Control (RLC/MAC) Protocol", (GSM 04.60 Version 6.1.0); European Telecommunications Standards Institute (ETSI).

(Continued)

*Primary Examiner*—Chau Nguyen
*Assistant Examiner*—Andrew C. Lee
(74) *Attorney, Agent, or Firm*—Perman & Green, LLP (57) ABSTRACT

The invention relates generally to a method and an arrangement for transferring information in a packet radio service. The invention further concerns the technology of transferring control information relating to packet data transfer resources on individual packet-switched radio connections at the interface between a transmitting device and a receiving device. It s an objective of this invention to provide a method and a system that offers solutions to the prior art problems. Especially, it is an object of this invention to provide a solution for signalling, which enables the use of more than one connection (TBF) and time slot for packet data transfer in one data transfer direction, and the use of asymmetric resources for uplink/downlink data transfer. The objectives of the invention are fulfilled by providing a procedure, in which the one and same uplink control channel is used for transferring uplink control information, which relates to at least two downlink TBFs. This is preferably achieved by including in the uplink control message information on which downlink time slot the concerned TBF is transferred, assuming the uplink control channel uses an uplink timeslot of which the peer downlink timeslot (i.e. with same timeslot number) is not used by the concerned TBF. It is also preferably achieved by including in a downlink control message information on which uplink time slot control information is transferred corresponding to a determined TBF.

21 Claims, 6 Drawing Sheets

U.S. PATENT DOCUMENTS

| | | | |
|---|---|---|---|
| 6,532,225 B1 * | 3/2003 | Chang et al. | 370/341 |
| 6,747,962 B1 * | 6/2004 | Lintulampi et al. | 370/329 |
| 6,778,509 B1 * | 8/2004 | Ravishankar et al. | 370/322 |
| 6,952,591 B1 * | 10/2005 | Budka et al. | 455/517 |
| 7,006,477 B1 * | 2/2006 | Balachandran et al. | 370/337 |

FOREIGN PATENT DOCUMENTS

| | | |
|---|---|---|
| WO | WO 00/54464 | 9/2000 |

OTHER PUBLICATIONS

"Digital Cellular Telecommunications System (Phase 2+); Multiplexing and Multiple Access On The Radio Path", (GSM 05.02 Version 5.1.0); European Telecommunications Standards Institute (ETSI).

* cited by examiner

ADVANCED METHOD AND ARRANGEMENT FOR TRANSFERRING INFORMATION IN A PACKET RADIO SERVICE

TECHNICAL FIELD OF THE INVENTION

The invention relates generally to a method and an arrangement for transferring information in a packet radio service. The invention further concerns the technology of transferring control information relating to packet data transfer resources on individual packet-switched radio connections at the interface between a transmitting device and a receiving device.

BACKGROUND ART OF THE INVENTION

The denomination "mobile telecommunications system" refers generally to any telecommunications system, which enables a wireless communication connection between a mobile station (MS) and the fixed parts of the system when the user of the mobile station is located within the service area of the system. A typical mobile communications system is a Public Land Mobile Network (PLMN). The majority of mobile telecommunications systems in use at the time of the filing of this patent application belong to the second generation of such systems, a well-known example being the GSM system (Global System for Mobile telecommunications). However, the invention also applies to the next or third generation of mobile telecommunications systems, such as a system known as the UMTS (Universal Mobile Telecommunications System).

Multi-user radio communication systems must have well-defined procedures for allocating radio resources (time, frequency) to individual radio connections. In this patent application we will consider especially packet-switched radio connections in cellular radio systems where each cell comprises a base station, which is arranged to communicate with a multitude of mobile stations. As an example we will discuss the well-known GPRS system (General Packet Radio Service), the known resource allocation procedures of which are laid down in the technical specification number GSM 04.60 published by ETSI (European Telecommunications Standards Institute) [1].

Packet switched wireless networks, such as GPRS (General Packet Radio Service), are designed to provide data services, e.g. Internet services, cost-effectively. In GPRS the channels are not dedicated to one user continuously but are shared between multiple users. This facilitates efficient data multiplexing. However, different kinds of data services have different requirements for the data connection. For example, Internet real time services have gained popularity during the past few years; IP (Internet Protocol) telephony and different streaming applications are already common in the Internet. These services have different requirements for the data connection compared to, for example, transferring facsimiles or email messages. Therefore the connection for the data transfer is usually established according to the service requirements, such as the Quality of Service (QoS) requirement. However, the use of many kinds of services during the same session then requires the use of several connections or "temporary block flows", each being dedicated to a certain type of service.

In order to better understand the problems of the prior art solutions and the idea of the present invention, the structure of a prior art digital cellular radio system is next described in short, and GPRS is then described in more detail by briefly describing some parts of said specification [1].

Figure 1A:
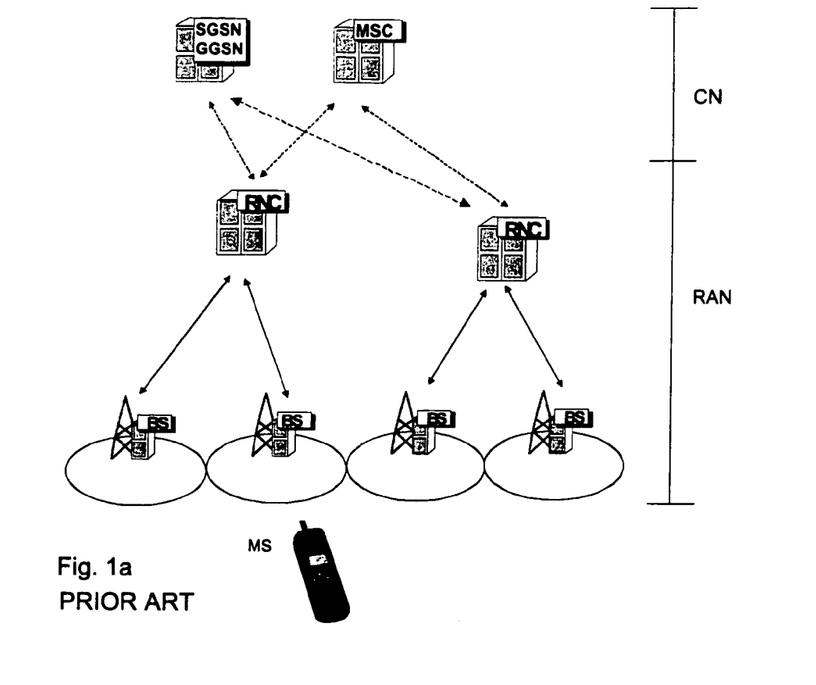
FIG. 1a illustrates a prior art cellular communications system.

FIG. 1a shows a version of a prior known GSM cellular radio system. The terminals MS are connected to the radio access network RAN which includes the base stations and the base station controllers/radio network controllers RNC. The core network CN of a cellular radio system comprises mobile services switching centres (MSC) and related transmission systems. If the system supports GPRS services, the core network also comprises Serving GPRS Support Nodes (SGSN) and Gateway GPRS Support nodes (GGSN). According e.g. to the GSM phase 2+ specifications developed from GSM the core network may provide new services such as GPRS. The new types of radio access networks can co-operate with different types of fixed core networks CN and especially with the GPRS network of the GSM system.

Figure 1B:
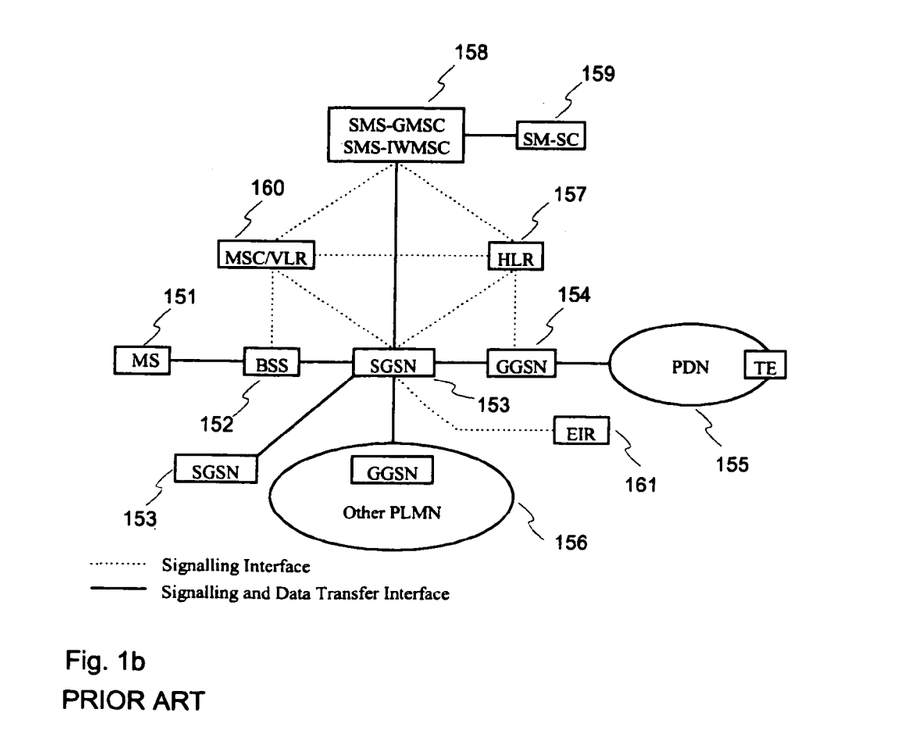
FIG. 1b illustrates architecture of general packet radio service (GPRS)

FIG. 1b shows architecture of a general packet radio service (GPRS). The GPRS is a new service that is currently based on the GSM system but it is supposed to be generic in the future. GPRS is one of the objects of the standardisation work of the GSM phase 2+ and UMTS at the 3GPP ($3^{rd}$ Generation Partnership Project). The GPRS operational environment comprises one or more subnetwork service areas, which are interconnected by a GPRS backbone network. A subnetwork comprises a number of packet data service nodes (SN), which in this application will be referred to as serving GPRS support nodes (SGSN) 153, each of which is connected to the mobile telecommunications system (typically to a base station through an interworking unit) in such a way that it can provide a packet service for mobile data terminals 151 via several base stations 152, i.e. cells. The intermediate mobile communication network provides packet-switched data transmission between a support node and mobile data terminals 151. Different subnetworks are in turn connected to an external data network, e.g. to a Public Data Network (PDN) 155, via GPRS gateway support nodes GGSN 154. The GPRS service thus allows the provision of packet data transmission between mobile data terminals and external data networks when the appropriate parts of a mobile telecommunications system function as an access network.

In order to access the GPRS services, a mobile station shall first make its presence known to the network by performing a GPRS attachment. This operation establishes a logical link between the mobile station and the SGSN, and makes the mobile station available for SMS (Short Message Services) 158, 159, over GPRS, paging via SGSN, and notification of incoming GPRS data. More particularly, when the mobile station attaches to the GPRS network, i.e. in a GPRS attachment procedure, the SGSN creates a mobility management context (MM context). Also the authentication of the user is carried out by the SGSN in the GPRS attachment procedure. In order to send and receive GPRS data, the MS shall activate the packet data address, which is to be used, by requesting a PDP activation procedure (Packet Data Protocol). This operation makes the mobile station known in the corresponding GGSN, and interworking with external data networks can commence. More particularly, a PDP context is created in the mobile station and the GGSN and the SGSN. The packet data protocol context defines different data transmission parameters, such as the PDP type (e.g. X.25 or IP), the PDP address (e.g. X.121 address), the quality of service (QoS) and the NSAPI (Network Service Access Point Identifier). The MS activates the PDP context with a specific message, Activate PDP Context Request, in which it gives information on the TLLI, the PDP type, the PDP address, the required QoS and the NSAPI, and optionally the access point name (APN).

FIG. 1*b* also shows the following GSM functional blocks: Mobile Switching Center (MSC)/Visitor Location Register (VLR) 160, Home Location Register (HLR) 157 and Equipment Identity Register (EIR) 161. The GPRS system is usually also connected to other Public Land Mobile Networks (PLMN) 156.

Functions applying digital data transmission protocols are usually described as a stack according to the OSI (Open Systems Interface) model, where the tasks of the various layers of the stack, as well as data transmission between the layers, are exactly defined. In the GSM system phase 2+, which in this patent application is observed as an example of a digital wireless data transmission system, there are five operational layers defined.

Figure 2:
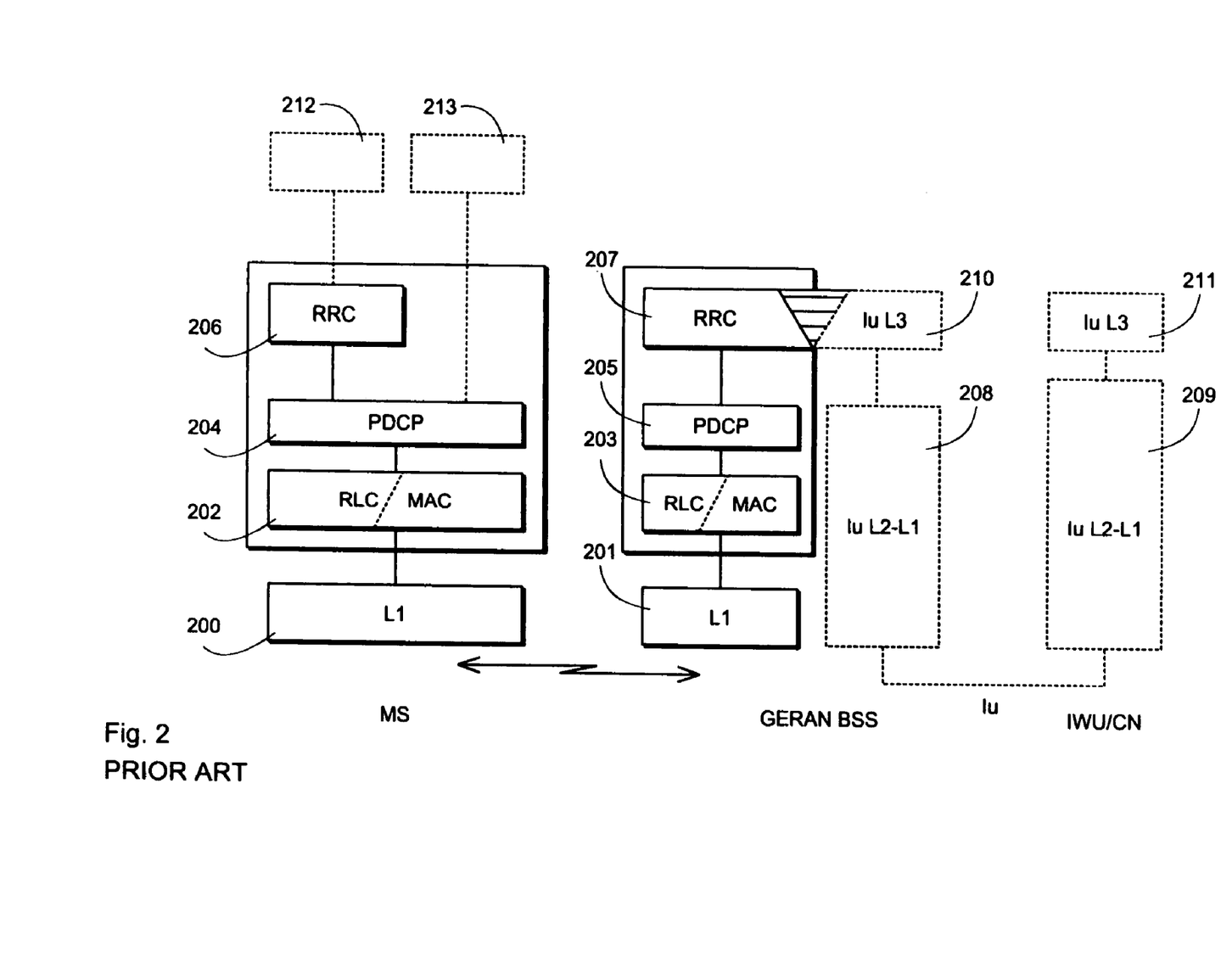
FIG. 2 illustrates protocol levels of a prior art cellular communications system.

Relations between the protocol layers are illustrated in FIG. 2. The lowest protocol layer between the mobile station MS and the base station subsystem is the layer 1 (L1) 200, 201, which corresponds to a physical radio connection. Above it, there is located an entity corresponding to the layers 2 and 3 of a regular OSI model, wherein the lowest layer is a radio link control/media access control (RLC/MAC) layer 202, 203; on top of it a PDCP layer 204, 205; and topmost a radio resource control (RRC) layer 206, 207. Between the base station subsystem GERAN BSS of the generic radio access network and an interworking unit/core network IWU/CN located in the core network, there is assumed to be applied a so-called Iu interface, where the layers corresponding to the above described layers from L1 to PDCP are the layers L1 and L2 of the OSI model (blocks 208 and 209 in the drawing), and the layer corresponding to the above described RRC layer is the layer L3 of the OSI model (blocks 210 and 211 in the drawing).

The mobile station MS must include a higher-level control protocol 212 and a protocol 213 for serving higher-level applications, of which the former communicates with the RRC layer 206 in order to realise control functions connected to data transmission connections, and the latter communicates directly with the PDCP layer 204 in order to transmit such data that directly serves the user (for instance digitally encoded speech). In a mobile station of the GSM system, the blocks 212 and 213 are included in the above-mentioned MM layer.

In GPRS, a Temporary Block Flow (TBF) is created for transferring data packets on a packet data channel. The TBF is a physical connection used by two mutually communicating Radio Resource (RR) peer entities to support the unidirectional transfer of PDCP Packet Data Units (PDU) from upper PDCP layers on physical channels for packet data. We will consider separately uplink TBFs (transfer of data from the mobile station to the base station) and downlink TBFs (transfer of data from the base station to the mobile station).

During an uplink TBF the mobile station will organise the data to be transferred into Protocol Data Units or PDUs. These are in turn divided into smaller parts which are distributed into data blocks on the RLC layer which defines the procedures related to information transfer over the radio interface. Each RLC data block will have a corresponding identification number as well as a multitude of associated fields containing information that relates to the contents and significance of the RLC data block. During a downlink TBF a similar arrangement of successive RLC data blocks is produced by the network and transmitted to the mobile station.

The TBF is thus established using a determined set of parameters for the data transfer, such as acknowledged/unacknowledged RLC mode, radio priority etc. If the mobile station with an existing TBF needs to transfer upper layer (or PDCP) PDUs with a different RLC mode the existing TBF is released and the new TBF is established for the new RLC mode. This means that the mobile station must request a completely new allocation of radio resources by first transmitting a request message on an access channel (PRACH or RACH; Packet Random Access Channel or Random Access Channel depending on whether or not the first one of these is available). The network will either grant or reject the request by sending a corresponding message on an access grant channel (PAGCH or AGCH; Packet Access Grant Channel or Access Grant Channel, same considerations of availability apply).

In downlink, to change RLC modes the network must allow for the termination timer in the mobile station to expire for terminating the existing TBF allocation, and establish a completely new TBF by sending a Packet Downlink Assignment message on a PCCCH or CCCH (Packet Common Control Channel or Common Control Channel depending on availability).

In the prior art systems it has not been possible to transfer simultaneously PDCP PDUs using different RLC modes, different radio priorities or different throughput classes. This is a difficult limitation, because in a GPRS system a mobile station may support different types of services and therefore there may also exist a need to transfer PDCP PDUs with different parameters simultaneously. Especially, if one of the supported services is a real time service, the delay caused by releasing the existing TBF and the establishment of new TBF to support the service could be unacceptable.

Higher bit rates are one of the most important targets in the standardisation of new packet data services. The flexibility of services and the simplicity of the terminals are other important objectives. In order to achieve higher bit rates the terminals may use several timeslots. This multi slot capability means that the mobile station is able to transmit more than one channel and/or receive more than one channel within the TDMA frame. Most service scenarios are asymmetric in nature and traffic in downlink is usually seen to be higher than in the uplink direction. Therefore traffic scenarios like 3+1 are introduced meaning that 3 timeslots are used in downlink direction and one timeslot is used in uplink direction. Current GPRS specification supports at most one connection TBF (Temporary Block Flow)) in each direction (Uplink, Downlink) regardless how many timeslots are allocated. However, in document WO 00/54464 [2] there is disclosed a method, wherein at least two TBFs can be used in one data transfer direction.

The connection is identified with the same identifier in every TDMA timeslot PDCH (Packet Data CHannel) used for the connection. This identifier is called TFI (Temporary Flow Identifier) in GPRS. This TFI is unique on all PDCH's used for the TBF. In the future when packet data services are widely used, having at most one connection per direction is an unnecessary limitation and therefore several simultaneous connections in the same direction will be supported which are identified using different or same temporary block flow identifiers (TFI). This is commonly referred to as multiple TBFs. However these scenarios have not addressed any applicable solution for how control signalling is done assuming the multislot classes specified at the present.

In the following PACCH (Packet Associated Control CHannel) occurence when a TBF is established is described, depending on the different allocation mechanisms for the data in uplink direction, [1]. In this text, PACCH/U means uplink part of a PACCH, PDCH/D means downlink PDCH and PDCH/U means uplink PDCH.

In case of downlink TBF only, the RRBP field is used to reserve PACCH/U. The RRBP value specifies a single uplink block in which the mobile station shall transmit either a PACKET CONTROL ACKNOWLEDGEMENT message or a PACCH block to the network. When received a given DL PDCH, the RRBP refers to the same uplink PDCH.

Dynamic Allocation

The mobile station shall attempt to decode every downlink RLC/MAC block on all assigned PDCHs. Whenever the mobile station receives an RLC/MAC block containing an RLC/MAC control block, the mobile station shall attempt to interpret the message contained therein. If the message addresses the mobile station, the mobile station shall act on the message.

Whenever the mobile station detects an assigned USF value on any assigned PDCH, the mobile station may transmit a PACCH block on the same PDCH in the next block period. The mobile station shall not transmit an RLC data block in any uplink radio block allocated via the polling mechanism.

Extended Dynamic Allocation

The mobile station shall attempt to decode every downlink RLC/MAC block on all monitored PDCHs. Whenever the mobile station receives an RLC/MAC block containing an RLC/MAC control block, the mobile station shall attempt to interpret the message contained therein. If the message addresses the mobile station, the mobile station shall act on the message.

The network shall transmit all PACCH messages on the PDCH carried on the lowest numbered timeslot in the allocation.

Whenever the mobile station detects an assigned USF value on any assigned PDCH, the mobile station may transmit a PACCH block on the same PDCH in the next block period. The mobile station shall not transmit an RLC data block in any uplink radio block allocated via the polling mechanism.

Fixed Allocation Uplink

A multislot class type 1 mobile station shall monitor a radio block on an assigned PDCH for downlink a PACCH block, according to its multislot capabilities:

if the radio block is not assigned as part of a measurement gap; and the uplink is not allocated during the radio block; and the uplink of the $T_{ID}$, timeslot(s) immediately after the radio block is not allocated [3]; and if the mobile, is multislot class 1 through 12, the uplink of the $T_{ra}$ timeslot(s) immediately before the radio block is not allocated, [3].

if the mobile is multislot class 19 through 29, the uplink of the $T_{rb}$ timeslot(s) immediately before the radio block is not allocated, [3].

The network shall leave such sets of gaps in the uplink fixed allocation for the purpose of transmission of the downlink PACCH.

A mobile station shall monitor one PDCH in the allocation for downlink PACCH except during the measurement gap. The network shall indicate that PDCH on uplink resource assignment (DOWNLINK_CONTROL_TIMESLOT parameter) according to MS multi slot class. DOWNLINK_CONTROL_TIMESLOT parameter shall always indicate a timeslot number, which is used for TBF uplink.

A Multi slot Class type 2 mobile station shall monitor all assigned PDCHs for PACCH, unless the mobile station also has current downlink TBF, in which case PDCH assigned for the downlink TBF shall take precedence.

After the fixed allocation is exhausted, the mobile station shall continue to monitor all assigned PDCH(s) that it is able to monitor according to its multi slot class.

In the case of simultaneous uplink and downlink TBFs, the mobile station shall monitor all assigned downlink PDCHs and any uplink PDCHs it is able to monitor.

The mobile station may transmit a PACCH block on any uplink radio block allocated via the ALLOCATION_BIT-MAP.

In the case of simultaneous uplink and downlink TBFs, the mobile station shall not transmit an RLC data block, in any uplink radio block allocated via the polling mechanism [1] (subclause 10.4.4).

Figure 3:
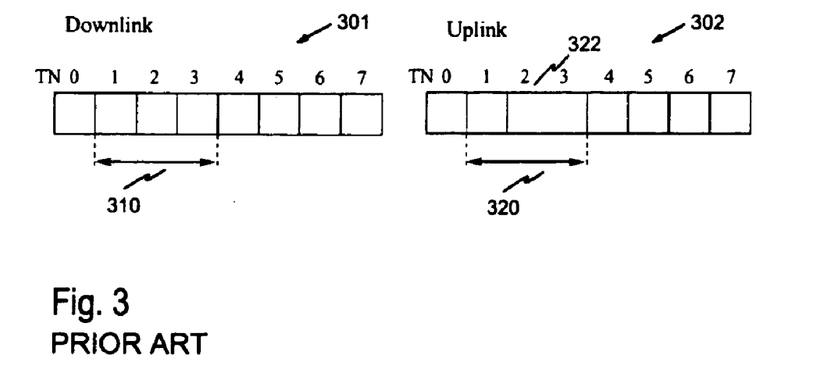
FIG. 3 illustrates the use of TDMA time slots in an exemplary multi slot system.

The problem of uplink controlling is next described in more detail referring to FIG. 3. FIG. 3 shows a downlink TDMA frame 301 and an uplink TDMA frame 302, which both have 8 time slots TN0 . . . TN7. FIG. 3 depicts a multi slot, class 4 MS i.e. 3 time slots in downlink and 1 time slot in uplink. There are two parallel connections active in the downlink data transfer using uplink time slots TN1, TN2 and TN3, 310. The temporary block flow TBF-A is transferred on time slots TN1 and TN2, and a temporary block flow TBF-B is transferred on the time slot TN3. In the uplink direction there is one connection TBF-U, which is allocated on uplink TN2, 322. If the connections use acknowledged model RLC then RLC blocks from all the TBFs have to be acknowledged on the same uplink channel PACCH/U (Packet Assosciated Control CHannel/Uplink) on time slot 322, due to the multislot class constraints.

An uplink control channel is used, for example, for transferring acknowledgement messages, which inform whether the downlink data transfer of a determined TBF has been successful. Packet downlink ack/nack message has an information element "Global TFI" that identifies the temporary block flow to which acknowledgement is related. If the network has allocated the same TFI values for two connections, e.g. TFI-A and TFI-B have the same value, then downlink TBF cannot be unambiguously identified in Packet downlink ack/nack message. RRBP (Relative Reserved Block Period) cannot be used as such for TBFs, because e.g. in the previous example, it could reserve blocks on TN1 or TN3, which would not be allowed.

SUMMARY OF THE INVENTION

It is an objective of this invention to provide a method and a system that offers solutions to the prior art problems. Especially, it is an object of this invention to provide a solution for signalling, which enables the use of more than one connection (TBF) and time slot for packet data transfer in one data transfer direction, and the use of asymmetric resources for uplink/downlink data transfer.

The objectives of the invention are fulfilled by providing a procedure, in which the one and same uplink control channel is used for transferring uplink control information, which relates to at least two downlink TBFs. This is achieved by including in the uplink control message information on which downlink time slot the concerned TBF is transferred. It is also preferably achieved by including in a downlink control message information on which uplink time slot control information is transferred corresponding to a determined TBF.

In GPRS, the method according to the invention thus allows for conveying on a single uplink PDCH/U the PACCH/U of several downlink TBFs that are assigned on different downlink PDCH/Ds, in order to comply with the multi slot class constraints of an MS, and consequently allows for using multiple TBFs with any multi slot classes as defined currently in the standard [1]. It also provides means for expanding today's use of RRBP field to comply with the new proposed use of PACCH (Packet Associated Control CHannel).

Further, the invention can be implemented in GPRS by, for example, introducing a new field, UPLINK_CONTROL_ TIMESLOT, while assigning a downlink TBF or reallocating the resources of a downlink TBF in order to inform the MS of which uplink timeslot to use for sending control messages for that particular TBF. In this context, it is also preferable to use the RRBP to specify a single uplink block on the UPLINK_CONTROL_TIMESLOT in which the mobile station shall transmit either a PACKET CONTROL ACKNOWLEDGEMENT message or a PACCH block to the network.

It is thus characteristic to a method according to the invention for transferring at least one data flow by creating at least one connection between a mobile station and network on a packet radio service of a telecommunication system, said at least one connection constituting a temporary block flow on a packet data channel that is assigned to a time slot of a downlink TDMA (Time Division Multiple Access) frame, wherein at least two simultaneous temporary block flows are assigned for transferring the at least one data flow, and uplink control information concerning a temporary block flow is transferred on an uplink control channel that is assigned to a time slot of an uplink TDMA frame, that uplink control information relating to the at least two simultaneous downlink temporary block flows is transferred on one and same uplink control channel, and at least one of said at least two simultaneous downlink temporary block flows is transferred on one or several downlink TDMA time slot(s), each of which are different from a downlink TDMA time slot that corresponds to the uplink TDMA time slot, which is used for said one and same uplink control channel.

The invention also applies to a telecommunications system for transferring at least one data flow by creating at least one connection between a mobile station and network on a packet radio service of a telecommunication system, said at least one connection constituting a temporary block flow on a packet data channel that is assigned to a time slot of a downlink TDMA (Time Division Multiple Access) frame, wherein at least two simultaneous temporary block flows are assigned for transferring the at least one data flow and uplink control information concerning a temporary block flow is transferred on an uplink control channel that is assigned to a time slot of an uplink TDMA frame, which is characterised in that it comprises means for transferring uplink control information relating to the at least two simultaneous temporary block flows on a one and same uplink control channel, and at least one of said at least two simultaneous downlink temporary block flows is transferred on one or several downlink TDMA time slot(s), each of which are different from a downlink TDMA time slot that corresponds to the uplink TDMA time slot, which is used for said one and same uplink control channel.

The invention further applies to a mobile station comprising means for transmitting/receiving at least one data flow on at least one connection between the mobile station and network on a packet radio service of a telecommunication system, said at least one connection constituting a temporary block flow on a packet data channel that is assigned to a time slot of a downlink TDMA (Time Division Multiple Access) frame, wherein at least two simultaneous temporary block flows are assigned for transferring the at least one data flow and uplink control information concerning a temporary block flow is transferred on an uplink control channel that is assigned to a time slot of an uplink TDMA frame, which is characterised in that it comprises means for transmitting uplink control information relating to the at least two simultaneous temporary block flows on one and same uplink control channel, and at least one of said at least two simultaneous downlink temporary block flows is transferred on one or several downlink TDMA time slot(s), each of which are different from a downlink TDMA time slot that corresponds to the uplink TDMA time slot, which is used for said one and same uplink control channel.

Preferred embodiments of the invention are presented in dependent claims.

BRIEF DESCRIPTION OF THE DRAWINGS

In the following, the invention is described in more detail by means of the attached drawings in which.

DETAILED DESCRIPTION

FIGS. 1A, 1B, 2 and 3 were described above in the prior art description. In the following, an exemplifying embodiment for implementing a method of the present invention is described referring to FIG. 4, and a further exemplifying embodiment of a GPRS environment is described referring to FIG. 5. Also examples of messages that can be used in a GPRS implementation are described. Some Finally a mobile station and a cellular system according to the invention are shortly described referring to FIGS. 6 and 7.

Figure 4:
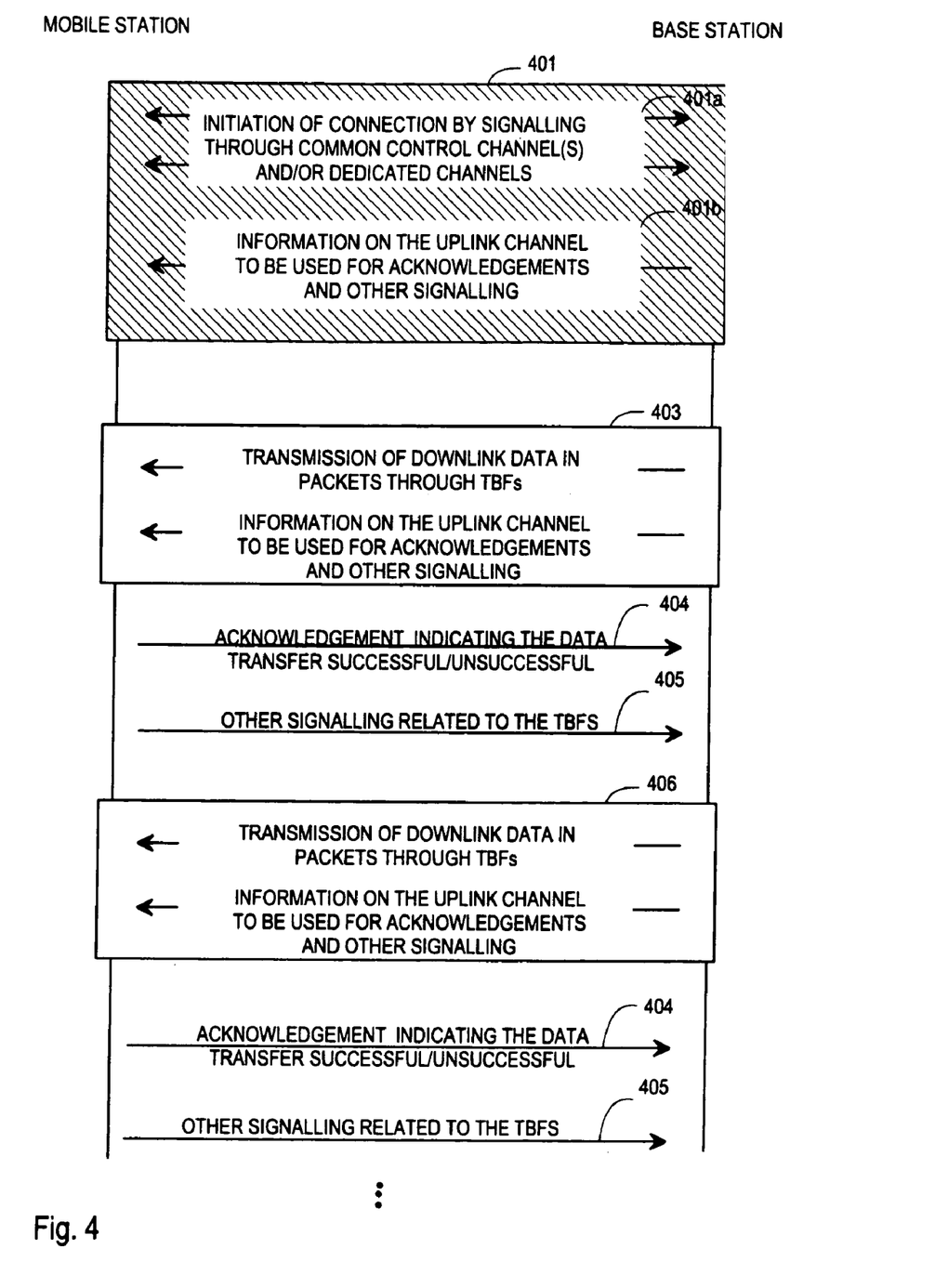
FIG. 4 illustrates an a signal flow diagram of an exemplary method according to the invention.

In FIG. 4 a mobile station and a base station are illustrated schematically as communicating parties. We will assume that the mobile station and the base station are operating in a multi-user environment where there is a certain set of common control channels available to a large number of users and where dedicated communication channels may be allocated to individual connections according to need.

The hatched block 401 represents the initiation of a packet-switched communication connection, which starts by an initial indication of its need to set up a connection. This initial transmission takes place usually on a common control channel, as illustrated by the upper arrow in block 401a, and some further exchange of information on the common control channels or on dedicated channels may follow it as illustrated by the lower arrow in block 401a. The communication channels are allocated for the needs of the connection; the double-ended arrow in block 401a represents the fact that two-way traffic may be required to acknowledge the allocation. The dedicated communication channels may comprise data channels, control channels, and/or other kinds of channels according to need. The downlink control messages for assigning a downlink packet data channel may also, according to present invention, include information on the uplink control channel that must be used by the mobile station for the control messages that relate to the assigned downlink data channel. Such a message is shown in block 401b. According to the invention control messages that relate to different TBFs on different time slots of the downlink TDMA frame can be transmitted using common time slots of a TDMA frame.

The actual transmission of downlink data packets takes place on the dedicated communication channel(s) according to block 403. The data flow may also include control information, and thus it is also possible to inform the mobile station, which block of the uplink channel is allocated for the uplink control messages related to the concerned downlink TBF. Thus it is possible to transmit downlink control in the data channel allocation phase for e.g. allocating a time slot for the packet data channel and control channel and/or in headers of the packet data flow for allocating the data block for the uplink control messages and for informing the related downlink TBF.

The mobile station then acknowledges the received downlink data flow on the uplink control channel that has been allocated for the downlink data channel, 404. The mobile station then includes information in the control message, which downlink TFI it relates to. According to the present invention, the mobile station also includes information in the control message, which time slot is used by the related downlink TBF so that this TBF can be unambiguously determined by the network. The mobile station may also transmit other signalling information on the assigned control channel, such as measurement results, that relate to the concerned downlink packet data channel.

The base station then continues the transfer of packet data, 406. If the previously transferred packet data was not successfully received by the mobile station, the base station gets this information through the acknowledgement message and will then retransmit the data on a higher priority compared to next data packets to be sent. The downlink data transfer is again acknowledged with a control message, 404. The phases 403–406 may be repeated as long as there is downlink data to be transferred. The invention does not limit the number of repetitions through steps 403 to 406. After the reservoir of packets has been exhausted for any existing connection the connection may be terminated according to a known procedure.

Setting up an uplink TBF and transmitting a flow of RLC data blocks through it takes place according to known procedures which are outside the scope of the present invention and will not be described in detail. These procedures usually start from the common control channels. If at the time of setting up an uplink TBF there already exists a downlink TBF between the mobile station and the base station, the mobile station will transmit the initial request for setting up the uplink TBF through the signalling mechanisms related to the downlink TBF. The messages in which such a request will be communicated are the Packet Downlink Ack/Nack messages, which the mobile station transmits on a Packet Associated Control Channel or PACCH. The invention does not set any specific limits to the procedures that are used to initially set up the TBF, but it is illustrative of the applicability of the invention to regard the setup as taking place on the common control channels.

Figure 5:
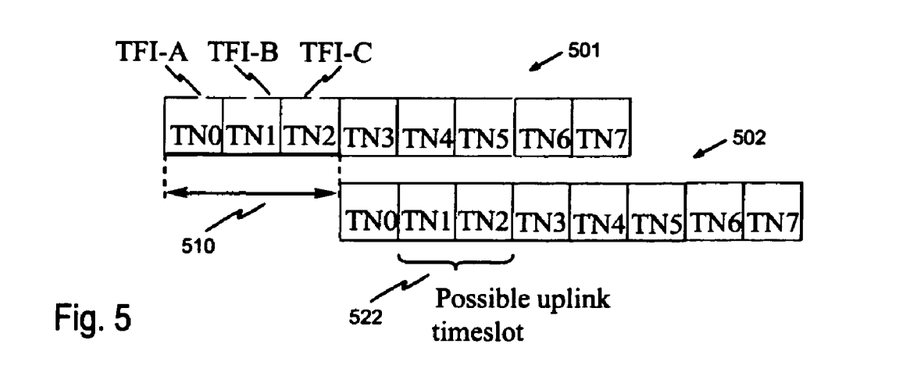
FIG. 5 illustrates the use of TDMA time slots in an exemplary system according to the invention.

FIG. 5 illustrates an example on how the TDMA time slots are used for transferring packet data and control data in a method according to the invention in GPRS. The TDMA frames are illustrated in such a way that the simultaneous downlink and uplink time slots are one upon the other. When using the multi slot capability of the mobile station the downlink and uplink data transfer should not be allocated on simultaneous time slots. The network should also take into account that the mobile station may require time gaps in order to perform channel and neighbouring cell measurements.

There are three Temporary block flows TBF-A, TBF-B and TBF-C with Temporary Flow Identifiers TFI-A, TFI-B and TFI-C. Downlink time slots TN0, TN1 and TN2 of the downlink TDMA frame 501 are allocated for the TBFs, respectively. Uplink time slot TN1 or TN2, 522, of the uplink TDMA frame 502 can be allocated for the uplink packet data and control channels. In order to convey on a single PDCH/U the PACCH/U of several downlink TBFs that are assigned on different PDCH/Ds, it must be possible to differentiate the control messages related to each of the TBFs. As a TFI value may be used by two different TBFs on two different PDCHs, the TFI itself is not enough to identify the owner (TBF) of the control message sent as seen earlier. Because a TFI is unique on all PDCHs used for the corresponding TBF, the Timeslot Number (main timeslot number in case of a multi slot TBF) needs to be appended, as a new field, to the TFI field in control messages in order to uniquely identify the TBF to which the control message refers. The TFI values can be determined e.g. as follows:

TBF-A are identified with (TFI=9; TN=1)
TBF-B are identified with (TFI=9; TN=2)
TBF-C are identified with (TFI=17; TN=3)

Next some exemplary messages and data fields are described which can be used for implementing the present invention in the GPRS.

RRBP Field

This section describes how the RRBP is presently used, and the new way it is proposed to use it according to the invention. The RRBP field (Relative Reserved Block Period) value specifies a single uplink block in which the mobile station shall transmit either a PACKET CONTROL ACKNOWLEDGEMENT message or a PACCH block to the network.

The RRBP is included in all RLC/MAC data blocks and may be included in RLC/MAC control blocks. For RLC/MAC data block, the validity of RRBP is informed via the (E)S/P bit(field). For RLC/MAC control block the RRBP is always valid. When the RRBP is received as part of an RLC/MAC block on a PDCH, an uplink block is reserved on the same PDCH in uplink (i.e. having the same TN) as is shown in [1] (section 10.4.5).

Using the RRBP in this way when having multiple TBFs is not compliant with all multi slot classes, as said earlier. The absence of RRBP implies that neither measurements nor acknowledgement bitmaps can be ordered by the network to the MS, unless creating new messages to command the mobile station to send this information. Therefore it is proposed to use the RRBP field but adapt its definition so that it can be used with the new usage of PACCH/U as described earlier.

According to an embodiment of the present invention it is proposed that a new field, UPLINK_CONTROL_TIMESLOT, be introduced while assigning a downlink TBF or reallocating the resources of a downlink TBF in order to inform the MS of which uplink timeslot to use for sending control messages for that particular TBF. In this context, it is also proposed to use the RRBP to specify a single uplink block on the UPLINK_CONTROL_TIMESLOT in which the mobile station shall transmit either a PACKET CONTROL ACKNOWLEDGEMENT message or a PACCH block to the network.

It should be noted that in order to respect the MS multi slot class, the UPLINK CONTROL TIMESLOT for a TBF may be changed if the mobile station gets new TBFs on different PDCHs.

Packet Downlink Assignment

This message is sent on the PCCCH or PACCH by the network to the mobile station to assign downlink resources to the mobile station.

For a mobile station assigned to operate in the fixed allocation MAC mode, the networks may assign, regularly repeating intervals during which the mobile station shall measure neighbour cell power levels. A mobile allocation or reference frequency list received as part of this assignment message shall be valid until a new assignment is received or such TBF of the MS are terminated. This message is classified as a non-distribution message.

Figure 6A:
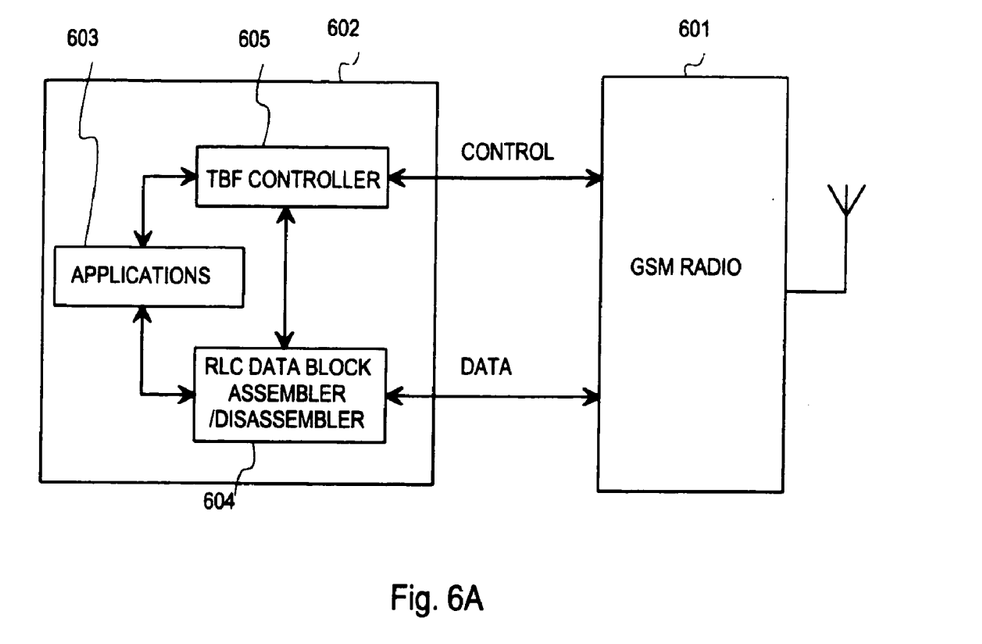
FIG. 6A illustrates basic parts of an exemplary mobile station according to the invention.

We will next briefly describe a mobile station and a base station subsystem according to an advantageous embodiment of the invention. FIG. 6A illustrates schematically a mobile station which comprises a GSM radio transceiver 601 known as such as means for implementing packet-switched radio connections with a remote base station. A packet data part 602 is coupled to the GSM radio transceiver. The source and sink of transmitted and received data respectively is the applications block 603, and the transmission of data between it and the GSM radio transceiver goes through a RLC data block assembler/disassembler 604. A TBF controller 605 is responsible for setting up and maintaining the TBFs according to the needs expressed by the applications block on one hand and to the setup requests received from the network on the other. According to the invention the TBF controller 605 is arranged to construct and transmit control messages that relate to at least two TBFs on the same uplink control channel.

Figure 6B:
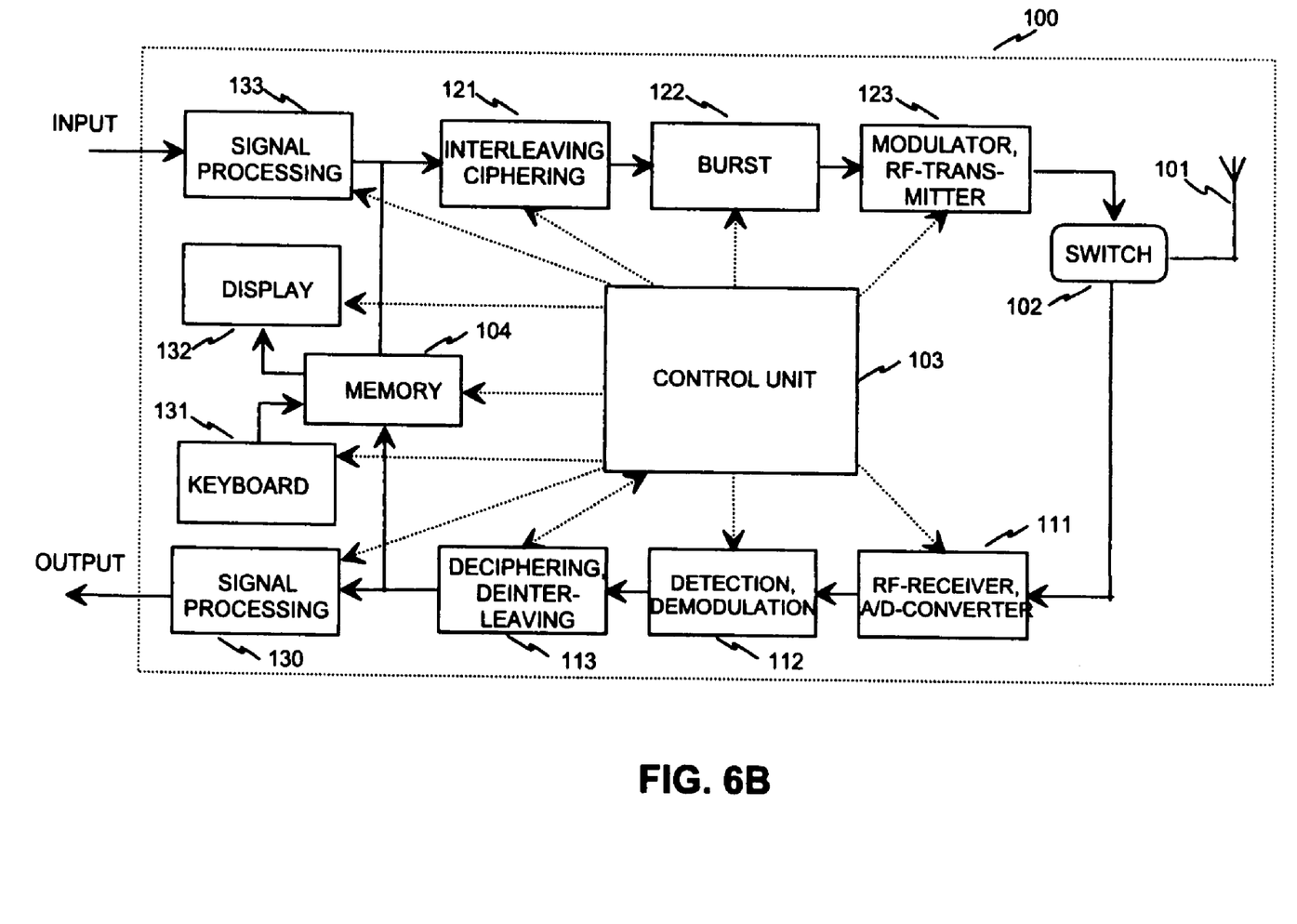
FIG. 6B illustrates a block diagram of an exemplary a mobile station according to the invention.

FIG. 6B shows a more detailed block diagram of a mobile station 100 according to the invention. The mobile station comprises an antenna 101 for receiving radio frequency signals from base stations. The received RF signal is led with the switch 102 to the RF receiver 111, in which the RF signal is amplified and converted digital. Thereafter the signal is detected and demodulated in block 112. The type of the demodulator depends on the system radio interface. It may include a QAM demodulator, or a RAKE combiner. The deinterleaving is made in block 113. After this, the signal is

TABLE 2

PACKET DOWNLINK ASSIGMENT information elements

```
<Packet Downlink Assignment message content >::=
<PAGE_MODE: bit (2)>
{0|1 <PERSISTENCE_LEVEL: bit (4) > ¯4}
{ {0 <Global TFI;<Global TFI IE>>
    |10 <TLLI: bit (32) >}
{0 -- Message escape
    {  <MAC-MODE: bit (2)>
       <RLC-MODE: bit (1)>
       <CONTROL-ACK: bit (1)>
       <TIMESLOT_ALLOCATION: bit (6)>
       <Packet Timing Adwance: <Packet Timing Advance IE>>}
       {0|1 <PO: bit (4)>
       <BTS_PWR_CTRL_MGDE: bit (1)>
       <PR-MODE: bit (1) >}
       {{0|1 <Frequency Parameters: <Frequency Parameters IE>>}
       {0|1 <DOWNLINK_TFI_ASSIGNMENT: bit (5)>}
       {0 |1 < Power Control Parameters: < Power Control Parameters
            IE >>}
       {0 |1 < TBF Starting Time: < Starting Frame Number Description
            IE >>}
       {0|1 <Measurement Mapping: <Measurement Mopping struct>>}
       {null|0 bit** = <no string>
       |1{0|1 <EGPRS Window Size: <EGPRS Window Size IE>>}
       <LINK_QUALITY_MEASUREMENT_MODE: bit (2)>
       {0|1 <BEP_PERIOD2: bit(4)>}}
       {0|1 <Packet Extended Timing Advance: bit (2)>}
       {0|1 <COMPACT reduced MA: <COMPACT reduced MA IE>>}
       {null|0 bit** = <no string>
       |1 {0|1<UPLINK CONTROL TIMESLOT: bit (3)}},
       < padding bits > }}// -- truncation at end of message allowed, bits '0'
           assumed
    !<Non-distribution part error: bit(*)=<no string>>}
!<Message escape: 1 bit(*) = <no string>>}
!<Address information part error: bit (*) = <no string>>}
!<Distribution part error: bit (*) = <no string>>;
<Measurement Mapping struct>:: =
    <Measurement Starting Time: <Starting Frame Number Description IE>>
    <MEASUREMEN_INTERVAL: bit (5)>
    <MEASUREMENT_BITMAP: bit (8)>;
``` processed according to the signal type (speech/data). The received packet data can be converted acoustic with a loudspeaker, or the received packet data can be linked to a separate device, such as a video monitor. A control unit 103 controls the receiver blocks according to a program that is stored into a memory 104. Especially the control unit controls the receiving of control messages and reading from the messages information on the uplink control channel/time slot, which should be used for transmitting control information that relates to the determined downlink TBF.

In the transmission of a signal, the control unit controls the signal processing block 133 according to the type of signal. Block 121 further makes the ciphering and interleaving for the signal. In a TDMA transmitter bursts are formed from the coded data in block 122. The bursts are further modulated and amplified in block 123. The RF signal is led to the antenna 101 via the switch 102 for transmission. The processing and the transmission of bursts and blocks are also controlled by the control unit. Especially the control unit controls the transmission of the control bursts in such a way that they are coded and transmitted according to the present invention. The control unit thus controls the forming of control bursts in such a way that they are coded with the information on the related TBF. Also the channel selection is controlled by the control unit in such a way that the assigned control channel and time slot is used.

Figure 7:
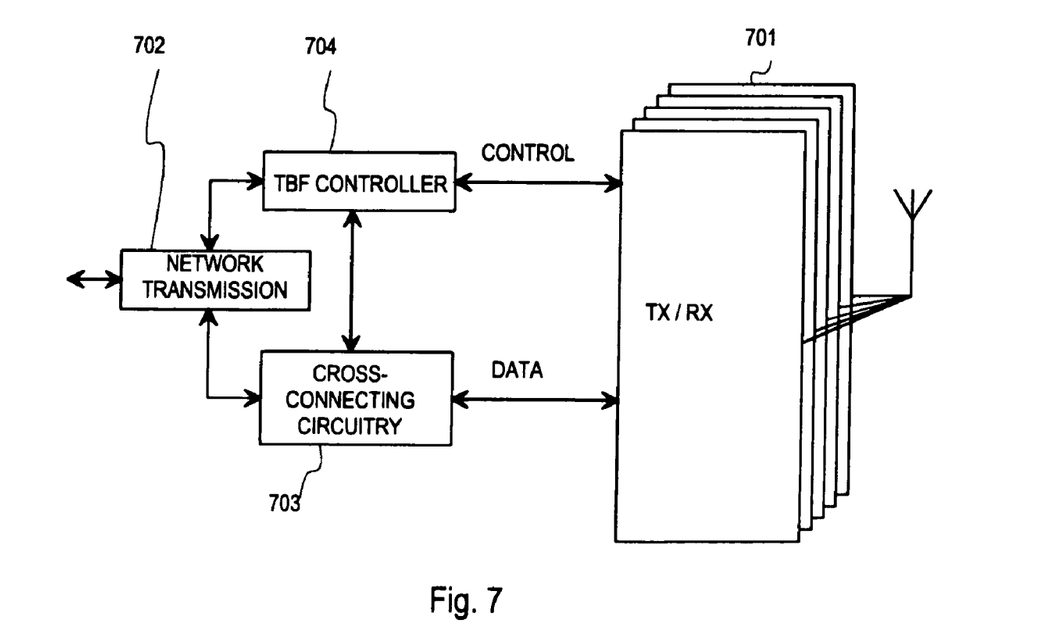
FIG. 7 illustrates basic parts of an exemplary base station for a mobile telecommunications system according to the invention.

FIG. 7 illustrates schematically a base station which comprises a plurality of transmit (TX) and receive (RX) units 701, a transmission unit 702 for communicating with a packet-switched network (GPRS) and a cross-connecting unit 703 for arranging the mapping of data between radio connections and network connections. It also comprises a TBF controller 704 responsible for setting up and maintaining the TBFs according to the setup requests received from the network on one hand and the setup requests received from the mobile stations on the other. According to the invention the TBF controller 704 is arranged firstly to make assignments for several TBFs and to construct and transmit control messages that include information e.g. on the number of the uplink slot for uplink control messages for the TBF. It is also arranged to receive control messages that relate to different TBFs from one and same control channel/time slot.

In general, the processing of information in a telecommunication device takes place in an arrangement of processing capacity in the form of microprocessor(s) and memory in the form of memory circuits. Such arrangements are known as such from the technology of mobile stations and fixed network elements. To convert a known telecommunication device into a telecommunication device according to the invention, it is necessary to store into the memory means a set of machine-readable instructions that instruct the microprocessor(s) to perform the operations described above. Composing and storing into memory of such instructions involves known technology which, when combined with the teachings of this patent application, is within the capabilities of a person skilled in the art.

Above, an example embodiment of the solution according to the invention has been described. The principle according to the invention can naturally be modified within the frame of the scope defined by the claims, for example, by modification of the details of the implementation and ranges of use.

Although the foregoing description uses the reserved names of certain messages and communication concepts which are strictly associated with a certain specification of a single packet-switched communication system, it is to be noted that the invention is generally applicable to all such communication systems with the allocation of dedicated channel(s) for data services. One should also note that there may be data transfer from/to a mobile station to/from several base stations.

Above, some examples of TBF communication parameters are given. However, many other alternative communication parameters that determine identity, control channel or time slot number relating to a TBF can be applied.

Cited Documents:

[1] Digital cellular telecommunications system (Phase 2+); General Packet Radio Service (GPRS); Mobile Station (MS)-Base Station System (BSS) interface; Radio Link Control/Medium Access Control (RLC/MAC) protocol (GSM 04.60 version 6.1.0); European Telecommunications Standards Institute (ETSI)

[2] WO 00/54464

[3] Digital cellular telecommunications system (Phase 2+); Multiplexing and multiple access on the radio path (GSM 05.02 version 5.1.0); European Telecommunications Standards Institute (ETSI)

The invention claimed is:

1. A method for transferring at least one data flow by creating at least one connection between a mobile station and a network on a packet radio service of a telecommunication system, said at least one connection including a temporary block flow on one or more packet data channels each of which being assigned to a different time slot of a downlink TDMA (Time Division Multiple Access) frame, said method comprising:

assigning at least two simultaneous temporary block flows for transferring the at least two data flows, transferring uplink control information concerning a temporary block flow on an associated uplink control channel that is assigned to a time slot of an uplink TDMA frame, transferring the at least two associated uplink control channels relating respectively to the at least two simultaneous downlink temporary block flows on one and same uplink TDMA time slot, and transferring at least one of said at least two simultaneous downlink temporary block flows on one or several downlink TDMA time slot(s), each of which is different from the downlink TDMA time slot that corresponds to the uplink TDMA time slot, which is used for said at least two uplink control channels.

2. A method according to claim 1, further comprising assigning said uplink control channel in a downlink message, and said message includes information on said uplink control channel.

3. A method according to claim 2, wherein the said message is a Packet Downlink Assignment.

4. A method according to claim 2, wherein said information on said uplink control channel comprises the number of the time slot for said control channel.

5. A method according to claim 1, wherein in that said packet radio service is the general packet radio service (GPRS).

6. A method according to claim 3, wherein the uplink control channel comprises the packet associated control channel (PACCH) associated to said downlink temporary block flow.

7. A method according to claim 6, further comprising reserving a single uplink block of said packet associated control channel (PACCH) with a relative reserved block period field (RRBP) sent on said downlink temporary block flow.

8. A method according to claim 6, wherein said packet associated control channel (PACCH) contains uplink control information including the temporary flow identifier (TFI) and timeslot number of said temporary block flow.

9. A method according to claim 1, further comprising transferring the at least two downlink temporary block flows on at least two downlink packet data channels, and transferring uplink data on at least one packet data channel, wherein the number of said downlink packet data channels is greater than the number of the uplink packet data channels.

10. A method according to claim 7, further comprising transferring said uplink control information on the same time slot which is used by one of said at least one uplink packet data channels.

11. A method according to claim 1, further comprising transferring the said uplink control information on an uplink time slot, the number of which corresponds to the number of a downlink time slot on which one of said packet data channels transferring one of said at least two temporary block flows is allocated.

12. A telecommunications system for transferring at least one data flow by creating at least one connection between a mobile station and a network on a packet radio service of a telecommunication system, said at least one connection including a temporary block flow on one or more packet data channels each of which being assigned to a different time slot of a downlink TDMA (Time Division Multiple Access) frame, said system comprising:
    means for assigning at least two simultaneous temporary block flows for transferring the at least two data flows,
    means for transferring uplink control information concerning a temporary block flow on an associated uplink control channel that is assigned to a time slot of an uplink TDMA frame,
    means for transferring uplink control information relating to the at least two simultaneous temporary block flows on the at least two associated uplink control channels respectively,
    means for transferring said at least two associated uplink control channels on one and same uplink TDMA time slot, and
    means for transferring at least one of said at least two simultaneous downlink temporary block flows on one or several downlink TDMA time slot(s), each of which is different from the downlink TDMA time slot that corresponds to the uplink TDMA time slot, which is used for said at least two uplink control channels.

13. A telecommunications system according to claim 12, wherein said uplink control information is transferred on an uplink time slot, the number of which corresponds to the number of a downlink time slot on which one of said packet data channels transferring one of said at least two temporary block flows is allocated.

14. A telecommunications system according to claim 12, wherein said packet radio service is the general packet radio service (GPRS).

15. A mobile station comprising:
    means for transmitting/receiving at least one data flow on at least one connection between the mobile station and network on a packet radio service of a telecommunication system, said at least one connection including a temporary block flow on one or more packet data channels each of which being assigned to a different time slot of a downlink TDMA (Time Division Multiple Access) frame,
    means for assigning at least two simultaneous temporary block flows for transferring the at least two data flows,
    means for transferring uplink control information concerning a temporary block flow on an associated uplink control channel that is assigned to a time slot of an uplink TDMA frame,
    means for transmitting uplink control information relating to the at least two simultaneous temporary block flows on the at least two associated uplink control channels respectively,
    means for transferring the at least two associated uplink control channels on one and same uplink TDMA time slot,
    means for transferring at least one of said at least two simultaneous downlink temporary block flows on one or several downlink TDMA time slot(s), each of which are different from the downlink TDMA time slot that corresponds to the uplink TDMA time slot, which is used for said at least two uplink control channels.

16. A mobile station according to claim 15, further comprising means for receiving a downlink message field, and means for reading from said message information on said uplink control channel to be used related to a determined downlink temporary block flow.

17. A mobile station according to claim 16, wherein said information on said uplink control channel comprises the number of the time slot for said control channel.

18. A mobile station according to claim 15, further comprising means for receiving the at least two simultaneous downlink temporary block flows on at least two downlink packet data channels, and means for transmitting uplink data on at least one packet data channel, wherein the number of said downlink packet data channels is greater than the number of the uplink packet data channels.

19. A mobile station according to claim 18, wherein said uplink control information is transferred on the same time slot which is used by one of said at least one uplink packet data channels.

20. A mobile station according to claim 15, wherein said uplink control information is transferred on an uplink time slot, the number of which corresponds to the number of a downlink time slot on which one of said packet data channels transferring one of said at least two temporary block flows is allocated.

21. A mobile station according to claim 15, wherein said packet radio service is the general packet radio service (GPRS).

* * * * *